S. D. HYDE.
VEGETABLE PEELING AND WASHING MACHINE.
APPLICATION FILED AUG. 22, 1907.
906,529.
Patented Dec. 15, 1908.
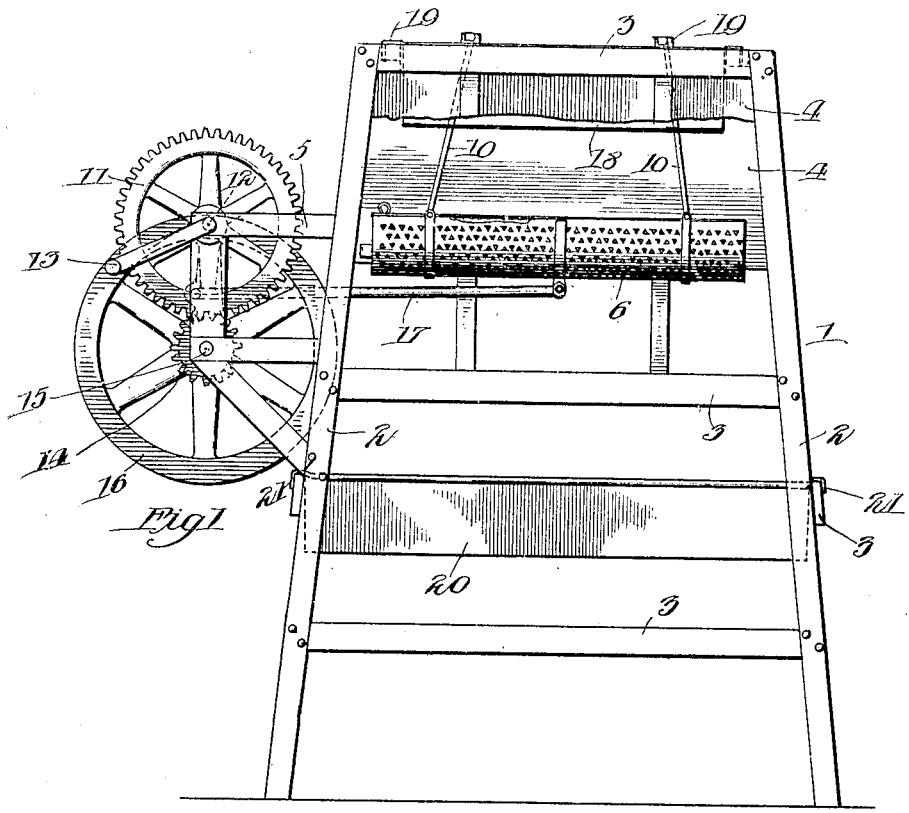
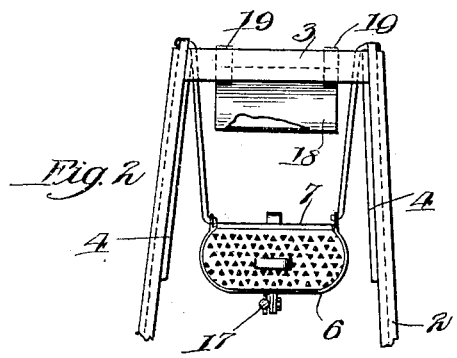
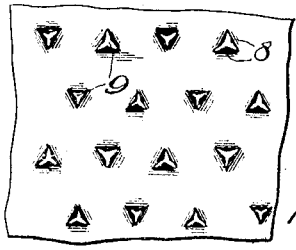
Witnesses.
V. L. Sherman
George L. Chindahl
Inventor:
Stephen D. Hyde
By Luther L. Miller
Atty.

UNITED STATES PATENT OFFICE.

STEPHEN D. HYDE, OF LINCOLN, NEBRASKA.

VEGETABLE PEELING AND WASHING MACHINE.

No. 906,529.         Specification of Letters Patent.         Patented Dec. 15, 1908.

Application filed August 22, 1907. Serial No. 389,606.

*To all whom it may concern:*

Be it known that I, STEPHEN D. HYDE, a citizen of the United States, residing at Lincoln, in the county of Lancaster and State of Nebraska, have invented certain new and useful Improvements in Vegetable Peeling and Washing Machines, of which the following is a specification.

The object of my invention is to produce a simple, efficient machine for peeling and washing potatoes and other vegetables.

The machine consists of a main frame, a perforated vegetable receptacle movably suspended in said frame and provided with abrading surfaces, a water reservoir, located directly over the vegetable receptacle and arranged to discharge water thereinto; and a drip pan situated directly below said receptacle and adapted to catch the drippings therefrom.

In the accompanying drawings, Figure 1 is a side elevation of a vegetable peeling and washing machine embodying my invention. Fig. 2 is a fragmental front view showing only the frame, the vegetable receptacle and the water reservoir. Figs. 3 and 4 are views illustrating the abrading surfaces of the vegetable receptacle.

1 represents the main frame which consists, in this instance, of four supports 2, the braces 3 and the upper side walls 4. At the forward end of said frame is a support 5 for the driving means. The said frame is so constructed as to economize space and at the same time provide a substantial support for every part of the machine.

6 is a vegetable receptacle provided with a cover 7. The receptacle may be of any suitable length or width, but its depth is preferably from three and one-half to five inches, in order to secure the most rapid cleaning action upon the potatoes or other vegetables. The side walls are curved so as to provide the largest possible amount of effective abrading surface. Said receptacle is preferably constructed of suitable sheet metal, and is provided with abrading surfaces formed by punching the sheet metal systematically with a punch of equilateral triangular form. Sets of three triangular prongs 8 (Figs. 3 and 4) having curved sides, arranged about triangular perforations 9, are thus formed. Said perforations are disposed in rows, each alternate perforation being reversed in position. Each alternate row also is shifted so as to bring the set of prongs 8 into slanting alinement.

The means herein shown for supporting the receptacle 6 in the machine frame comprises four links 10 attached to the ends of said receptacle and provided with bearings in the upper end of the frame. The upper ends of these rods being closer together than the lower ends, it will be seen that the receptacle 6 is adapted to have a swinging or tilting movement in the frame. In this instance the receptacle 6 is moved by means comprising a gear 11 fixed on a shaft 12 carried in the support 5, said shaft being provided with a hand crank 13. The gear 11 meshes with a pinion 14 mounted on a shaft 15 in the support 5. A fly wheel 16 is fixed on said shaft 12. The receptacle 6 receives its motion from the fly wheel 16 through a connecting rod 17 attached to a crank pin on said fly wheel and a pivot pin carried by said receptacle.

Directly above the receptacle 6 is a water reservoir 18 hung in the main frame 1 by means of the hooks 19 or any other suitable means. The bottom wall of said tank is perforated to allow water to drip onto the receptacle.

The frame 1 is provided with the side walls 4 to guard against the splashing of water from the receptacle 6.

At a suitable distance below the vegetable receptacle a drip pan 20 is removably supported in the main frame by hooks 21 or other suitable means. The drip pan 20 is sufficiently long to catch all the refuse from the receptacle 6 when the latter is in operation.

In use, the potatoes or other vegetables are deposited in suitable numbers in the receptacle 6 and the cover 7 slid into position. The water reservoir 18 is then filled and the receptacle 6 rapidly reciprocated or swung by rotating the hand crank 13. By reason of the combined reciprocating and tilting movements of the receptacle 6 the potatoes roll within said receptacle, every point of the surface of the potatoes being thus brought into contact with the abrading surfaces. The form and arrangement of the prongs are such as to reach every part of the surface of the potatoes. The receptacle 6 being rapidly reciprocated, the potatoes are brought into violent contact with the abrading surfaces, thereby quickly and effectively removing the skin from the potatoes. The water dripping from the water reservoir 18 washes the potatoes and carries the disintegrated skin through the perforations 9 in the bottom of the receptacle 6 into the drip pan 20.

I claim as my invention:

1. In a vegetable peeling and washing machine, in combination, a supporting frame; a vegetable receptacle movably supported in said frame and carrying skin-removing devices; means for swinging said receptacle; and means for supplying water to said receptacle.

2. In a vegetable peeling and washing machine, in combination, a supporting frame; a vegetable receptacle supported in said frame to move to and fro; means for bodily moving said receptacle to and fro; a cover for said receptacle, said receptacle and cover having openings therein; skin-removing devices upon the inner sides of said receptacle and cover comprising groups of curved triangular prongs; and means for supplying water to said receptacle.

3. In a vegetable peeling and washing machine, in combination, a supporting frame; a relatively shallow, closed receptacle having curved sides and provided with inwardly punched prongs covering its entire surface, said receptacle being supported in said frame to move to and fro; means for bodily moving said receptacle to and fro; and means for supplying water to said receptacle.

4. In a vegetable peeling machine, in combination, a supporting frame; a relatively shallow closed receptacle having curved sides and provided with abrading means covering its entire inner surface; and means for longitudinally moving said receptacle to and fro.

5. In a vegetable peeling machine, in combination, a supporting frame; a relatively shallow closed receptacle provided with abrading means covering its entire inner surface; and links for movably suspending said receptacle in said supporting frame, the upper ends of said links being closer together than their lower ends, whereby said receptacle is adapted to have a combined reciprocating and tilting movement.

6. In a vegetable cleaning machine, in combination, a supporting frame, a relatively shallow closed vegetable-receptacle, certain of the interior walls of which are adapted to clean the vegetables, and means for longitudinally moving said receptacle to and fro.

7. In a vegetable cleaning machine, in combination, a supporting frame, a relatively shallow closed vegetable receptacle, certain of the walls of which are adapted to clean the vegetables, and links for movably suspending said receptacle in said support, the upper ends of said links being closer together than their lower ends, whereby said receptacle is adapted to have a combined reciprocating and tilting movement.

STEPHEN D. HYDE.

Witnesses:
 ED STAGG,
 L. J. THURN.